T. O. DOILL.
Coffee-Roasters.
No. 156,550. Patented Nov. 3, 1874.
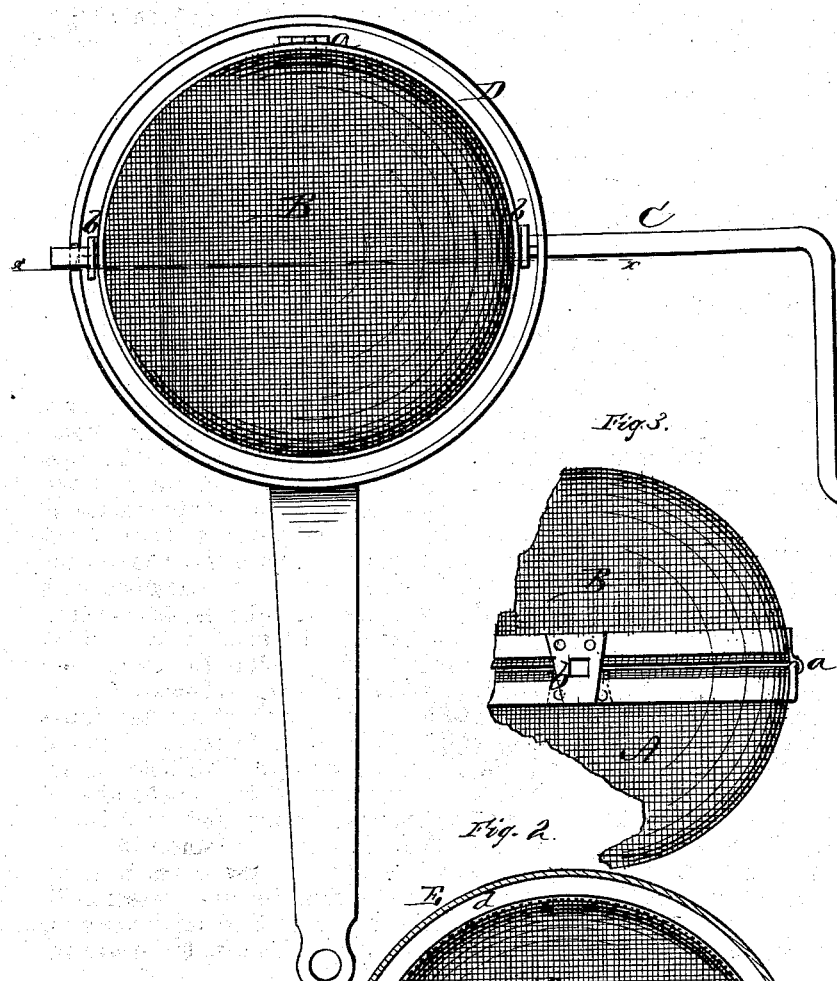

UNITED STATES PATENT OFFICE.

THOMAS O. DOILL, OF CORYDON, IOWA.

IMPROVEMENT IN COFFEE-ROASTERS.

Specification forming part of Letters Patent No. 156,550, dated November 3, 1874; application filed August 22, 1874.

*To all whom it may concern:*

Be it known that I, THOMAS O. DOILL, of Corydon, in the county of Wayne and State of Iowa, have invented certain new and useful Improvements in Coffee-Roasters; and I do hereby declare that the following is a full, clear, and exact description thereof, reference being had to the accompanying drawings, and to the letters of reference marked thereon, which form part of this specification.

The nature of my invention consists in providing the inner half-spheres with ears, which overlap each other, and have square holes in them for the purpose of firmly locking the parts together by means of the square shaft, as will be hereinafter more fully set forth.

In order to enable others skilled in the art to which my invention appertains to make and use the same, I will now proceed to describe its construction and operation, referring to the annexed drawing, in which—

Figure 1 is a plan view of my coffee-roaster with the top removed. Fig. 2 is a longitudinal vertical section of the same, and Fig. 3 shows a section of the inner sphere.

My coffee-roaster is composed of an inner and an outer hollow sphere. The inner sphere is made of two hemispheres, A and B, of wire-cloth or perforated sheet metal, hinged together as shown at $a$. On the sides of the two parts A and B are ears $b\ b$, which overlap each other when the parts are closed together, and in said ears are made square holes, as shown in Fig. 3, for the passage of the square part of a shaft, C. This shaft, by passing through the ears $b\ b$, locks the two parts firmly together, so that they cannot come apart until the shaft is withdrawn. The outer sphere is also composed of two parts, D and E, and is made of cast-iron or other suitable metal. When the sphere A B is placed therein the shaft C rests in bearings formed in the edge of the part D, and an air-chamber, $d$, is formed between the two spheres, as shown in Fig. 2. One end of the shaft C is provided with a crank, G, for turning the same, and thereby to revolve the inner sphere A B.

The coffee being placed within the inner sphere A B and the outer sphere D E closed and placed in a stove-hole, the shaft is revolved, and by reason of the air-chamber $d$ the coffee becomes evenly and sufficiently roasted without burning. No smell of burning coffee will escape into the house, it being entirely confined within the outer vessel D E.

Having thus fully described my invention, what I claim as new, and desire to secure by Letters Patent, is—

The inner sphere, composed of two parts and provided with ears $b\ b$, overlapping each other, and having a square hole through them, in combination with the shaft C, all arranged as and for the purpose set forth.

In testimony that I claim the foregoing as my own I affix my signature in presence of two witnesses.

T. O. DOILL.

Witnesses:
 DAVID KIRK,
 JOHN MCANNELLY.